Aug. 14, 1962     T. F. ZLOTEK     3,049,206
SPRAG AND RETAINER ASSEMBLY
Filed Oct. 12, 1959     2 Sheets-Sheet 1
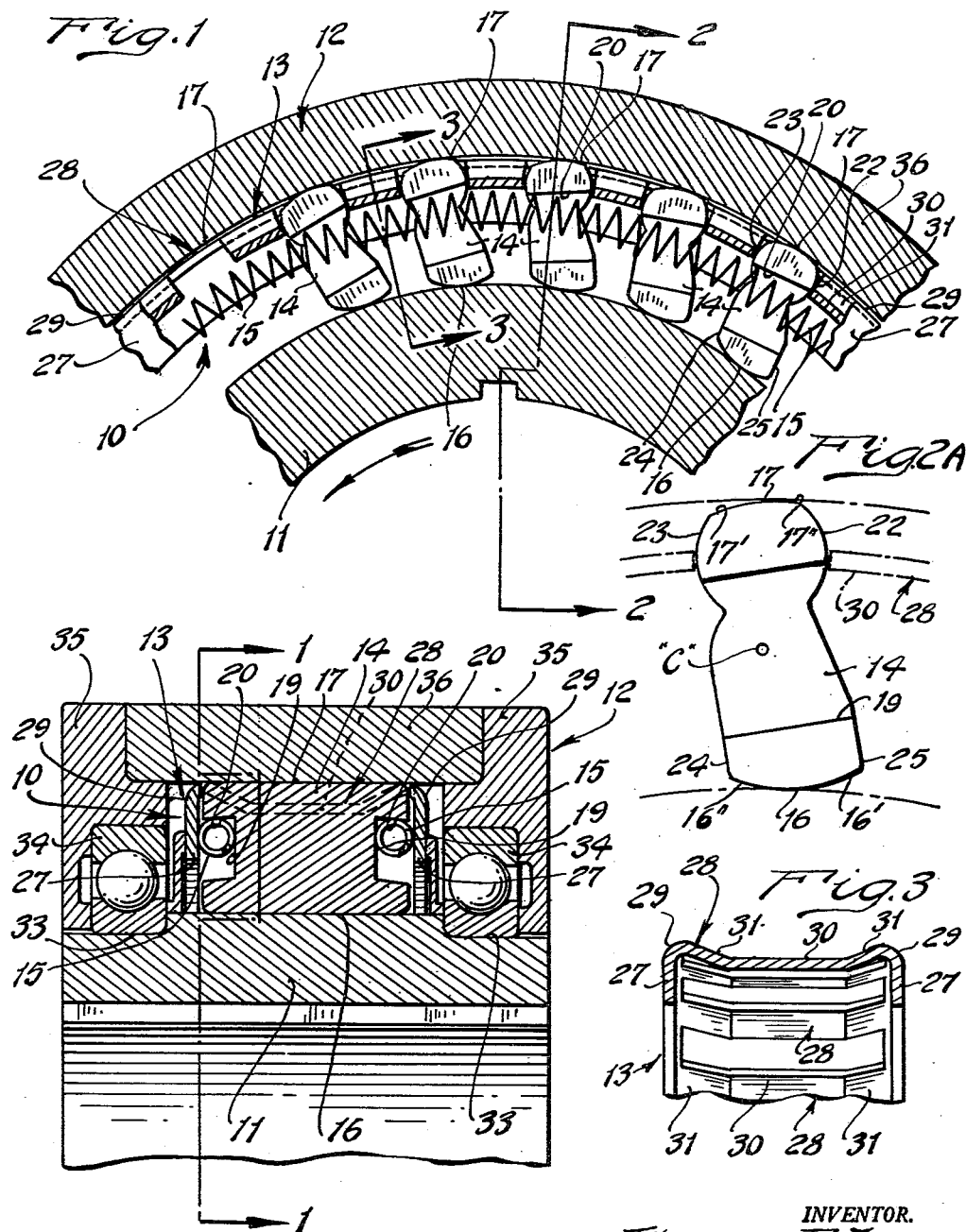
INVENTOR.
THADDEUS F. ZLOTEK
BY Whittemore, Hulbert &
Belknap
ATTORNEYS

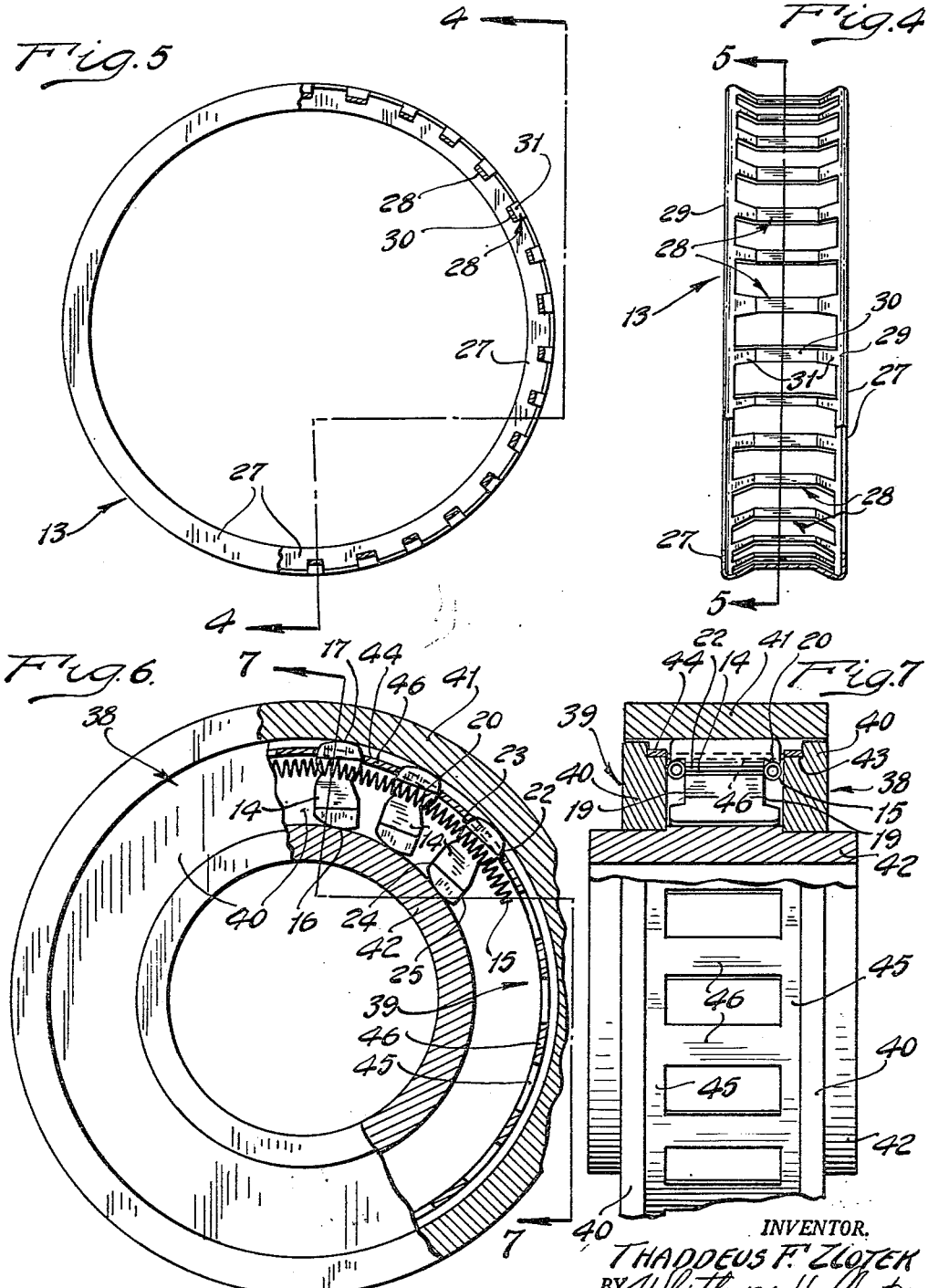

United States Patent Office 3,049,206
Patented Aug. 14, 1962

3,049,206
SPRAG AND RETAINER ASSEMBLY
Thaddeus F. Zlotek, Detroit, Mich., assignor to Formsprag Company, Warren, Mich., a corporation of Michigan
Filed Oct. 12, 1959, Ser. No. 845,834
6 Claims. (Cl. 192—45.1)

The present invention relates to an improved sprag and retainer assembly for sprag clutches and, more particularly, to such an assembly in which an annular retainer circumferentially spaces each of a circumferential series of sprag elements from one another in an improved manner, the retainer providing side bearings for the sprags in the rocking action of the latter in coming into and out of wedging engagement with concentric inner and outer annular clutch races.

It is an object of the invention to provide a sprag and retainer assembly in which the individual sprags of a series are equally spaced from one another in the circumferential sense by transversely or axially extending cross bars of an annular retainer, which may be located in sufficiently close radial adjacency to the outer race of the clutch to insure concentricity of the sprags in the annular space between the inner and outer clutch races; and in which the sprags are provided with rounded bearing surfaces on either circumferential side of an outer race-engaging wedging surface, these side bearing surfaces being adapted to have rolling engagement, along the axial length of the sprag, with adjacent edges of the retainer cross bars or members.

A further object of the invention is to provide a sprag and retainer assembly, in which the retainer features annular end rings located at either opposite axial end of the sprags and relatively closely adjacent to those ends, the cross bars of the retainer being offset slightly inwardly in the radial direction, and only sufficiently to enable the edges of the cross bars to be positioned for the rolling bearing engagement with the side surfaces of the sprags referred to above. Thus the sprags are axially and circumferentially restrained in their rocking motion in engaging and disengaging, circumferential spacing being kept uniform, with insurance that no sprag will move out of proper position and/or alignment to sustain its full share of force-transmitting stress in the operation of the clutch.

Yet another object is to provide a sprag and retainer assembly in which the cross bars referred to, whether formed integrally with the end rings of the retainer or, in an alternative construction, as transverse pieces seated at their opposite ends in rings of special composition, are in such relation to the sprags as to enable expanding garter springs to act on opposite ends of the sprags to bias the latter in a direction for wedging engagement with the races, without engaging the cross bars so as to interfere with proper, uniformly distributed spring action.

Another general object is to provide an assembly which, as indicated above, may have its retainer component fabricated integrally as to its end rings and cross bars, of a metal stamping, or of material other than metal, or may have these components separate from and assembled to one another, in a relationship of end rings and cross bars to the sprags mentioned above. The second alternative enables the end rings to be fabricated of special sintered metal stock or other appropriate bearing material, the sprag separating and bearing cross bars being formed as parts of a stamping having annular axial ends mating with the end rings of the retainer.

The foregoing as well as other objects will become more apparent as this description proceeds, especially when considered in connection with the accompanying drawings illustrating the invention, wherein:

FIG. 1 is a fragmentary view in section on a plane transversely of and normal to the axis of a sprag clutch incorporating the improved retainer and sprag assembly, in accordance with one embodiment thereof, the section being indicated by the line 1—1 in FIG. 2;

FIG. 2 is a fragmentary view in section along broken line 2—2 of FIG. 1;

FIG. 2A is a view of a sprag according to the invention in enlarged scale, showing its positional relationship to the retainer and races of a clutch;

FIG. 3 is a fragmentary view in section through the retainer along line 3—3 of FIG. 1;

FIG. 4 is a view of the retainer in end elevation, partially broken away and in radial section, as along line 4—4 of FIG. 5;

FIG. 5 is a face view of the retainer, partially broken away and in section along a line corresponding to line 5—5 of FIG. 4;

FIG. 6 is a face view, partially broken away and in section similar to FIG. 1, of a modified embodiment of the invention; and FIG. 7 is a fragmentary view in section along broken line 7—7 of FIG. 6.

First referring to FIGS. 1 and 2 of the drawings, the sprag and retainer assembly of the invention is generally designated by the reference numeral 10, and is shown conventionally mounted in the annular space between an inner clutch race 11, which may be considered the driving component of the clutch rotated in the direction indicated by the arrow in FIG. 1, and the outer race 12. The improved retainer of the assembly 10 is generally designated 13, its sprags are designated individually as 14, and an annular coiled garter spring 15 is in outward expanding engagement with the sprags 14 in a manner to urge their respective inner wedging surfaces 16 and their outer wedging surfaces 17 in a direction for wedging engagement with the adjacent surfaces of the inner and outer races 11, 12. As best shown in FIG. 2A, a load cam portion 16' of the inner surface is formed on a greater radius of curvature than its overrunning portion 16", and similarly the load cam portion 17' of the outer surface 17 is of greater radius than the overrun portion 17".

As shown in FIG. 2, the ends of the sprags 14 are recessed at 19 to receive the biasing springs 15, and the latter act against shoulders 20, in part defining these recesses, in a known manner to tilt the sprags for the desired race engagement. As shown in FIG. 2A, the sprags are formed with their center of gravity "C" slightly positive, thus under centrifugal force assisting springs 15 in energizing the sprags. However, if desired, the center of gravity may be otherwise located in the design of the sprag, as by removing material thereof or by changing its geometry, so as to enable the effect of centrifugal force at and above a predetermined speed to tend to de-energize the sprags and thereby make the clutch a self-disengaging one.

In accordance with the invention, the sprags 14 are formed with curved axial sides immediately adjoining and radially outwardly merging with the radially outer wedging surface 17 thereof to provide rounded bearing surfaces 22, 23 extending along the axial length of the respective sprag sides. The sprags 14 may be similarly formed along side surfaces 24, 25 immediately adjoining the inner wedging surface 16, enabling reversal of the sprags. In respect to the action of the sprags 14 in taking wedging engagement with the races 11, 12 so as to drive the latter when the former is driven in the direction of the arrow, and to release and slide when the outer race overruns the inner, it is in all respects identical with the action of known sprag clutches; and the improvement in the assembly 10 resides in the individual spacing of all sprags of the annular series from one another by the retainer 13, plus the bearing engagement afforded by the latter at the rounded bearing surfaces 22, 23 of the sprag adjoining its outer wedging surface 17.

Structural details of one embodiment of the retainer 13 are shown in FIGS. 3, 4 and 5 of the drawings, to which reference should be had in conjunction with FIGS. 1 and 2. Retainer 13 is preferably formed, in this embodiment, as a steel stamping or machined shape having a pair of axially spaced end ring members 27, between which the circumferentially spaced cross bars 28 integrally extend, the junction being made at rounded outer peripheral shoulders 29. Referring back to FIGS. 1 and 2, it is to be noted that the radius of the shoulder 29 closely approximates that of the inner surface of race 12, so that the retainer 13 may serve as a centering member insuring concentricity of assembly 10, when it is operatively associated with the races 11, 12.

The cross bars 28 are circumferentially spaced from one another a distance only slightly greater than the circumferential dimension across the rounded bearing faces or sides 22, 23 of the sprags, so as to enable free, nonbinding action of the latter as they tilt into and out of wedging engagement with the races. Between the shoulders 29 the cross bars 28 are only mildly offset inwardly in the radial sense, providing a central portion 30 of substantial length in the transverse or axial direction, with mildly angled portions 31 at either end thereof connecting it to the shoulders 29.

With this cross sectional outline, it is seen by reference to FIG. 1 that the edges of the cross bars 28 are positioned in the radial sense for rolling bearing engagement by the bearing surfaces 22, 23 of sprags 14 along a considerable portion of the axial dimension of the sprags. Thus the sprag is adequately restrained against undue circumferential shift or angular misalignment, the restraint being had with minimum friction at the bearing side surfaces 22, 23 of the sprags.

It will also be noted, by reference to FIG. 2, that with the assembly 10 mounted between races 11, 12, the annular coiled expanding springs 15 have outward engagement against the shoulder 20 of the sprags in annular zone within the rounded shoulders 29, the springs 15 being out of position for engagement with the cross bars in thus engaging the sprags, so that free and uniform spring action is insured.

As regards other clutch structure shown in FIG. 2, it constitutes no part of the present invention. The inner race 11 may be formed with annular, reduced diameter bearing shoulders 33 at its axial ends, with ball bearings 34 seated on these shoulders to act between the latter and end members 35 of outer race 12. An axially elongated annulus 36 secured between the members 35 provides the actual sprag-engaged surface of outer race 12.

A modified embodiment of the invention is illustrated in FIGS. 6 and 7, the sprag and retainer assembly of this embodiment being designated generally by the reference numeral 38. The sprags and springs of this adaptation are identical with those illustrated in FIGS. 1 and 2, and are correspondingly designated, therefore, as to their features.

The retainer of the assembly 38 is generally designated 39; and comprises a pair of like end members 40 which are formed by machining sintered iron or bronze stock to form the annular end members or rings 40. These may be of a radial dimension approximating the radial space between the outer and inner races 41, 42, respectively, to provide concentricity of the sprags, as mentioned in connection with the description of the first embodiment. End rings 40 are each provided with an annular shoulder 43 of reduced diameter about their outer periphery and adjacent their axially inner side surfaces, which shoulders receive and have secured thereto the annular cross bar member 44 of the retainer 39.

Member 44 is preferably formed as a steel stamping providing continuous annular seating ring formations 45 at its opposite axial ends which mate with and are secured on the shoulders 43 of end rings 40; and it will be noted by reference to FIG. 7 that the depth of shoulders 43 is approximately such as to bring the end member 44, across its transverse axial length, in the zone of the rounded side bearing surfaces 22, 23 of the individual sprags 14, for the desired bearing action in the tilting of the sprags.

Cross bars 46 are provided in retainer member 39 between the seating rings 45 of the latter, the spacing of these cross bars from one another being as described in connection with FIGS. 1 and 2 to enable the desired freedom of bearing action. As illustrated in FIG. 7, the cross bars 46 may extend between the seating rings 45 in approximately the same plane as the latter. However, if desired, the seating shoulders 43 may be of lesser radial depth than shown in FIG. 7, and the seating rings 45 of greater diameter, with the cross bars 46 offset radially inwardly somewhat more than is indicated in FIG. 7, in order to bring them in proper bearing relation to the surfaces 22, 23 in a substantially medial length of the cross bars between the seating rings 45 of member 44.

The porous characteristic of the sintered end rings 40 provides a desirable lubricating quality for special installations of this embodiment of the sprag and retainer assembly. However, it is to be understood that any other material having suitable bearing qualities may be employed. The same is true of components of the clutch which have been identified as steel stampings. It is to be understood that the invention is not unduly limited in this respect, and that other fabricating operations may be resorted to in the production of the parts.

What I claim as my invention is:

1. A clutch sprag and retainer assembly, comprising an annular series of like circumferentially spaced sprags each having radially opposed, inner and outer race-engaging surfaces and a rounded bearing surface on either circumferential side of said outer surface outwardly intersecting the latter, said bearing surfaces being convex and of closely similar arcuate contour and converging toward one another in a zone spaced radially inwardly of the outer race-engaging surface, an annular retainer to hold said sprags in assembly, comprising end ring members adjacent opposite axial ends of the sprags, and radially inwardly offset cross members extending between corresponding outer peripheral zones of said ring members in circumferentially spaced transverse zones between each of the successive sprags of the series, said sprags each having axially inwardly recessed formations at opposite axial ends thereof, said cross members defining therebetween sprag-receiving spaces which open substantially radially of the retainer, said cross members having their axial midpoints only sufficiently offset radially inwardly relative to said peripheral zones to take bearing engagement with said side bearing surfaces of the sprags, and spring means engaging said axial end formations of said sprags directly axially inwardly of said ring members, thus to bias the sprags for wedging engagement with the races without engagement of said spring means with said retainer cross members.

2. A clutch sprag and retainer assembly, comprising an annular series of like circumferentially spaced sprags each having radially opposed, inner and outer race-engaging surfaces and a rounded bearing surface on either circumferential side of said outer surface outwardly intersecting the latter, said bearing surfaces being convex and of closely similar arcuate contour and converging toward one another in a zone spaced radially inwardly of the outer race-engaging surface, an annular retainer to hold said sprags in assembly, comprising end ring members adjacent opposite axial ends of the sprags, and radially inwardly offset cross members extending between corresponding outer peripheral zones of said ring members in circumferentially spaced transverse zones between each of the successive sprags of the series, said sprags each having axially inwardly recessed formations at opposite axial ends thereof, said cross members defining therebetween sprag-receiving spaces which open substantially radially of the retainer, said cross members having medial portions of substantial axial length, compared with the axial distance between said ring members, paralleling the retainer axis and having their axial midpoints only sufficiently offset radially inwardly relative to said peripheral zones to take bearing engagement with said side bearing surfaces of the sprags, and spring means engaging said axial end formations of said sprags directly axially inwardly of said ring members, thus to bias the sprags for wedging engagement with the races without engagement of said spring means with said retainer cross members.

3. A clutch sprag and retainer assembly, comprising an annular series of like circumferentially spaced sprags each having radially opposed, inner and outer race-engaging surfaces and a rounded bearing surface on either circumferential side of said outer surface outwardly intersecting the latter, said bearing surfaces being convex and of closely similar arcuate contour and converging toward one another in a zone spaced radially inwardly of the outer race-engaging surface, an annular retainer to hold said sprags in assembly, comprising end ring members adjacent opposite axial ends of the sprags, and radially inwardly offset cross members integral with and extending between corresponding outer peripheral zones of said ring members in circumferentially spaced transverse zones between each of the successive sprags of the series, said sprags each having axially inwardly recessed formations at opposite axial ends thereof, said cross members defining therebetween sprag-receiving spaces which open substantially radially of the retainer, said cross members having their axial midpoints only sufficiently offset radially inwardly relative to said peripheral zones to take bearing engagement with said side bearing surfaces of the sprags, and spring means engaging said axial end formations of said sprags directly axially inwardly of said ring members, thus to bias the sprags for wedging engagement with the races without engagement of said spring means with said retainer cross members.

4. A clutch sprag and retainer assembly, comprising an annular series of like circumferentially spaced sprags each having radially opposed, inner and outer race-engaging surfaces and a rounded bearing surface on either circumferential side of said outer surface outwardly intersecting the latter, said bearing surfaces being convex and of closely similar arcuate contour and converging toward one another in a zone spaced radially inwardly of the outer race-engaging surface, an annular retainer to hold said sprags in assembly, comprising end ring members adjacent opposite axial ends of the sprags, and radially inwardly offset cross members extending between corresponding outer peripheral zones of said ring members in circumferentially spaced transverse zones between each of the successive sprags of the series, said sprags each having axially inwardly recessed formations at opposite axial ends thereof, said cross members defining therebetween sprag-receiving spaces which open substantially radially of the retainer, said cross members having their axial midpoints only sufficiently offset radially inwardly relative to said peripheral zones to take bearing engagement with said side bearing surfaces of the sprags, said ring members being fabricated of a sintered metal and shaped to provide annular recesses about the inner axial sides of said outer peripheral zones, in which recesses the ends of said cross members are received and secured, and spring means engaging said axial end formations of said sprags directly axially inwardly of said ring members, thus to bias the sprags for wedging engagement with the races without engagement of said spring means with said retainer cross members.

5. A clutch sprag and retainer assembly, comprising an annular series of like circumferentially spaced sprags each having radially opposed, inner and outer race-engaging surfaces and a rounded bearing surface on either circumferential side of said outer surface outwardly intersecting the latter, said bearing surfaces being convex and of closely similar arcuate contour and converging toward one another in a zone spaced radially inwardly of the outer race-engaging surface, an annular retainer to hold said sprags in assembly, comprising end ring members adjacent opposite axial ends of the sprags, and radially inwardly offset cross members integral with and extending between corresponding outer peripheral zones of said ring members in circumferentially spaced transverse zones between each of the successive sprags of the series, said sprags each having axially inwardly recessed formations at opposite axial ends thereof, said cross members defining therebetween sprag-receiving spaces which open substantially radially of the retainer, said cross members having medial portions of substantial axial length, compared with the axial distance between said ring members, paralleling the retainer axis and having their axial midpoints only sufficiently offset radially inwardly relative to said peripheral zones to take bearing engagement with said side bearing surfaces of the sprags, and spring means engaging said axial end formations of said sprags directly axially inwardly of said ring members, thus to bias the sprags for wedging engagement with the races without engagement of said spring means with said retainer cross members.

6. A clutch sprag and retainer assembly, comprising an annular series of like circumferentially spaced sprags each having radially opposed, inner and outer race-engaging surfaces and a rounded bearing surface on either circumferential side of said outer surface outwardly intersecting the latter, said bearing surfaces being convex and of closely similar arcuate contour and converging toward one another in a zone spaced radially inwardly of the outer race-engaging surface, an annular retainer to hold said sprags in assembly, comprising end ring members adjacent opposite axial ends of the sprags, and radially inwardly offset cross members extending between corresponding outer peripheral zones of said ring members in circumferentially spaced transverse zones between each of the successive sprags of the series, said sprags each having axially inwardly recessed formations at opposite axial ends thereof, said cross members defining therebetween sprag-receiving spaces which open substantially radially of the retainer, said cross members having medial portions of substantial axial length, compared with the axial distance between said ring members, paralleling the retainer axis and having their axial midpoints only sufficiently offset radially inwardly relative to said peripheral zones to take bearing engagement with said side bearing surfaces of the sprags, said ring members being fabricated of a sintered metal and shaped to provide annular recesses about the inner axial sides of said outer peripheral zones, in which recesses the ends of said cross members are received and secured, and spring means engaging said axial end formations of said sprags directly axially inwardly of said ring members, thus to bias the sprags for wedging engagement with the races without engagement of said spring means with said retainer cross members.

References Cited in the file of this patent
UNITED STATES PATENTS

| | | |
|---|---|---|
| 2,386,013 | Swenson | Oct. 2, 1945 |
| 2,824,636 | Troendly et al. | Feb. 25, 1958 |
| 2,892,523 | Zlotek | June 30, 1959 |
| 2,912,086 | Troendly et al. | Nov. 10, 1959 |
| 2,917,146 | Zlotek | Dec. 15, 1959 |
| 2,940,568 | Fagiano | June 14, 1960 |